United States Patent [19]

Fujikawa et al.

[11] 4,348,862
[45] Sep. 14, 1982

[54] EXHAUST SYSTEM FOR A TWO-CYCLE ENGINE

[75] Inventors: Tetsuzo Fujikawa, Kawogawa; Shinichi Tamba, Kobe, both of Japan

[73] Assignee: Kawasaki Jukogyo Kabushiki Kaisha, Hyogo, Japan

[21] Appl. No.: 223,644

[22] Filed: Jan. 9, 1981

Related U.S. Application Data

[63] Continuation of Ser. No. 921,679, Jul. 3, 1978, abandoned.

[30] Foreign Application Priority Data

| Jul. 1, 1977 | [JP] | Japan | 52-79381 |
| Oct. 27, 1977 | [JP] | Japan | 52-129468 |
| Dec. 15, 1977 | [JP] | Japan | 52-169138[U] |
| Dec. 16, 1977 | [JP] | Japan | 52-170307[U] |

[51] Int. Cl.³ .................... F01N 1/08; F02B 27/02
[52] U.S. Cl. ........................... 60/314; 181/249; 181/265
[58] Field of Search ............ 60/314, 312; 181/265, 181/249

[56] References Cited

U.S. PATENT DOCUMENTS

| 1,611,475 | 12/1926 | Maxim | 181/249 |
| 1,778,101 | 10/1930 | Bie | 181/265 |
| 3,434,280 | 3/1969 | Burkhart | 60/314 |
| 3,462,947 | 8/1969 | Nowak | 60/314 |

*Primary Examiner*—Douglas Hart
*Attorney, Agent, or Firm*—Sughrue, Mion, Zinn, Macpeak & Seas

[57] ABSTRACT

In the present invention, a second expansion chamber which includes a second diffuser is provided in pneumatic connection with the prior art first expansion chamber of an exhaust system for a two-cycle engine. The second expansion chamber creates a second pressure drop or relative vacuum substantially adjacent the point of pneumatic connection between the first and second expansion chambers, which acts to draw-out the exhaust gases present at the rear-cone shaped portion of the first diffuser. The second pressure drop or relative vacuum created by the second expansion chamber of the present invention thus overcomes the deficiencies caused by the pressure increase produced by the rear-cone shaped portion of the first diffuser. Several embodiments of the present invention are disclosed.

1 Claim, 14 Drawing Figures

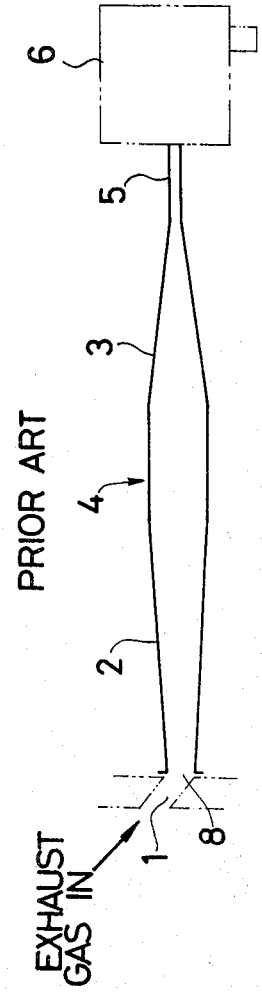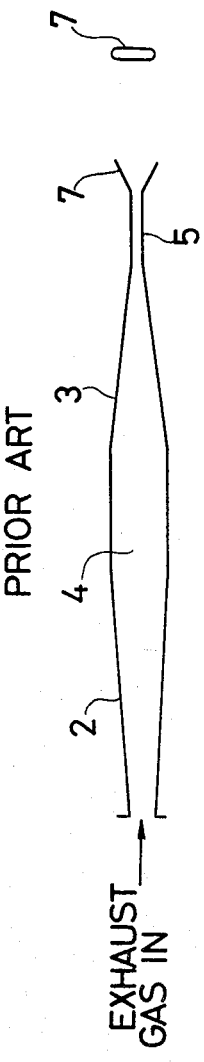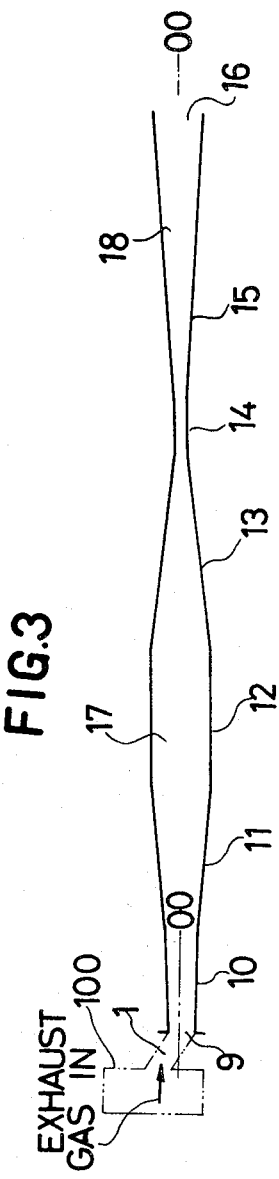

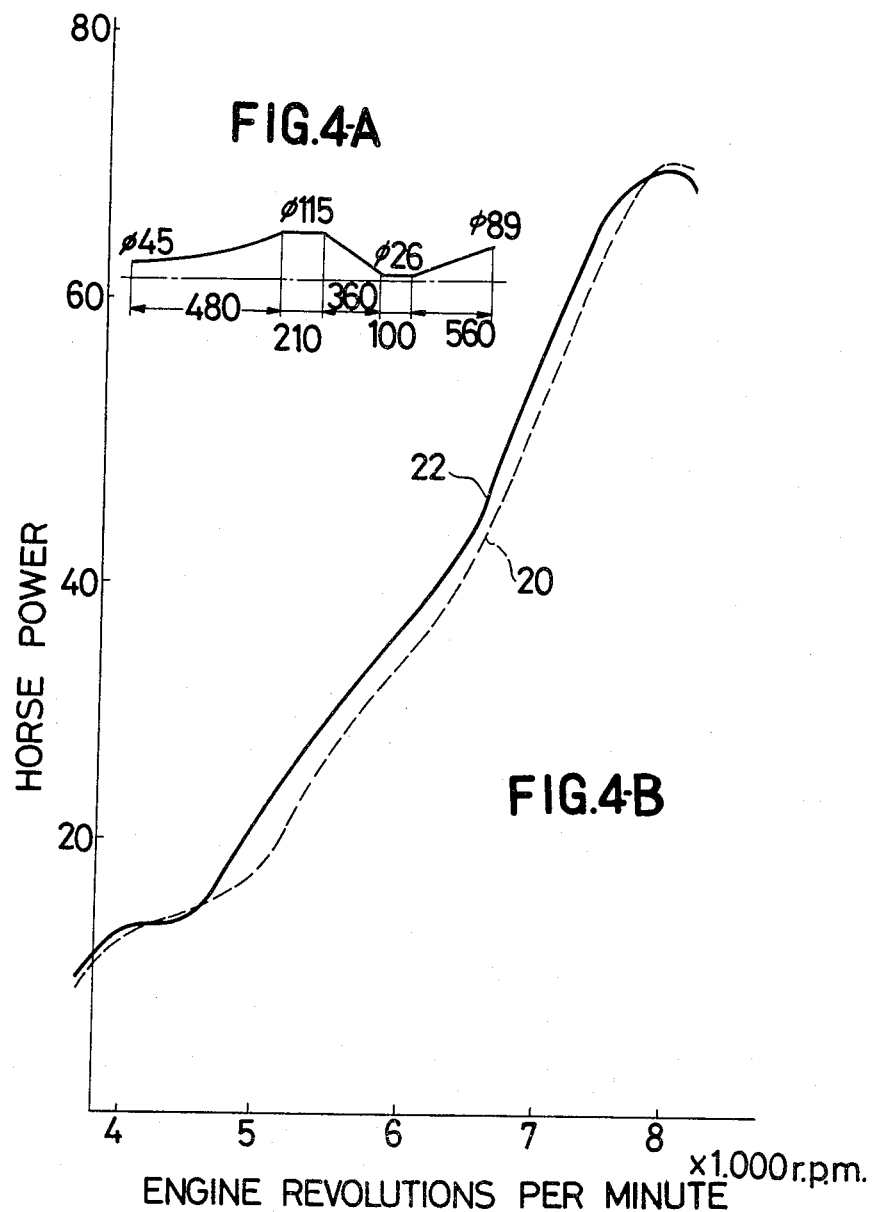

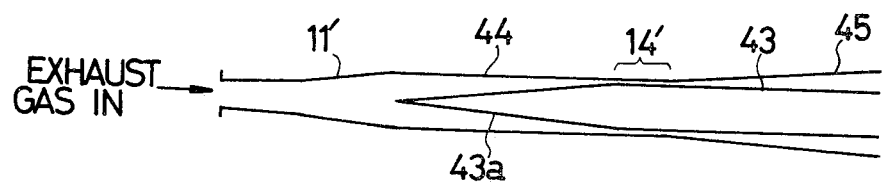
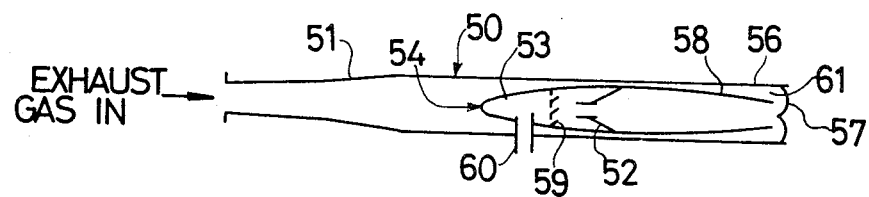
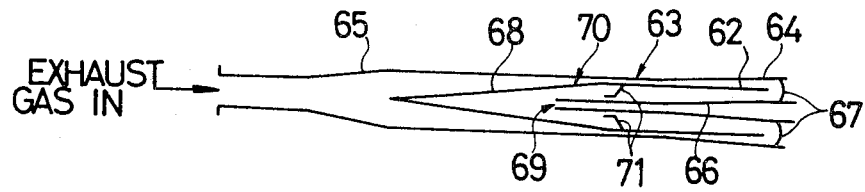

EXHAUST SYSTEM FOR A TWO-CYCLE ENGINE

This is a continuation of application Ser. No. 921,679, filed July 3, 1978, now abandoned, the benefit of which is claimed under 35 USC §120.

BACKGROUND OF THE INVENTION

1. Field of the Invention

This invention relates generally to an exhaust system for a two-cycle engine, and more particularly, to an exhaust system for a two-cycle engine having, in the order from the engine to the atmosphere or muffler, a first expansion chamber having a first divergent portion and a rear cone-shaped portion, and a second expansion chamber having a second divergent portion.

2. Description of the Prior Art

In the conventional exhaust system for a two-cycle engine, as shown in FIG. 1, there is provided an elongated exhaust pipe having an expanded chamber, designated by the reference numeral 4. Expansion chamber 4 includes a diffuser portion 2 and a rear-cone portion 3. The diffuser portion 2 is in pneumatic communication with an exhaust port 1 of the two-cycle engine 100 (not shown) at an inlet opening 8 thereof. Diffuser portion 2 provides a divergent wall which defines a progressively expanding exhaust gas flow passage, having a cross-section which increases as the exhaust gas moves away from exhaust port 1. The divergent wall of diffuser portion 2 creates a pressure drop or relative vacuum substantially adjacent the exhaust port 1, which acts to draw out the exhaust gases from the engine 100. The rear-cone portion 3 is positioned downstream of the diffuser portion 2, and provides a convergent wall which defines a progressively reducing exhaust gas flow passage, having a cross-section which decreases as the exhaust gas moves from the diffuser portion 2 to a tail pipe 5. The convergent wall of rear-cone portion 3 acts to reduce the amount of engine noise present at tail pipe 5, while at the same time, acts to increase the pressure of the exhaust gas as it moves toward tail pipe 5. Tail pipe 5 has an exhaust gas flow passage of a constant diameter. Tail pipe 5, in turn, is in pneumatic communication either with the atmosphere or with a muffler 6. Alternately, a small flat pipe 7 may be attached to the tail pipe 5, a shown in FIG. 2. However, in any prior art embodiment, in the situation where the exhaust gases are discharged from a plurality of cylinders through exhaust manifolds, which in turn are in pneumatic connection with a single exhaust pipe, the Kadenacy Effect in the diffuser portion 2 of the exhaust pipe is not adequately created. In addition, in the embodiments where the rear-cone portion is in pneumatic connection with the muffler, the internal pressure of the exhaust gases in the muffler is increased, which results in a lowering of the performance and efficiency of the two-cycle engine 100.

SUMMARY OF THE INVENTION

In the present invention, a second expansion chamber which includes a second diffuser is provided in pneumatic connection with the prior art first expansion chamber of an exhaust system for a two-cycle engine. The second expansion chamber creates a second pressure drop or relative vacuum substantially adjacent the point of pneumatic connection between the first and second expansion chambers, which acts to draw-out the exhaust gases present at the rear-cone shaped portion of the first diffuser. The second pressure drop or relative vacuum created by the second expansion chamber of the present invention thus overcomes the deficiencies caused by the pressure increase produced by the rear-cone shaped portion of the first diffuser. Several embodiments of the present invention are disclosed.

BRIEF DESCRIPTION OF THE DRAWINGS

FIG. 1 shows cross-sectional side view of a conventional exhaust system for a two-cycle engine;

FIG. 2 shows a cross-sectional side view of a different version of a conventional exhaust system for a two-cycle engine;

FIG. 3 shows a cross-sectional side view of the basic embodiment of the exhaust system of the present invention for a two-cycle engine;

FIG. 4A plots the radius on the vertical axis and the length on the horizontal axis for the physical measurements of one version of the basic embodiment of the present invention as shown in FIG. 3;

FIG. 4B plots the horse power on the vertical axis and the engine revolutions-per-minute on the horizontal axis of the power output produced by an engine employing the conventional exhaust system, as plotted by the dashed trace, and the power output produced by an engine employing the embodiment of the present invention of FIG. 3, as plotted by the solid trace; and FIGS. 5–13 show cross-sectional side views of other embodiments of the exhaust system of the present for a two-cycle engine.

DETAILED DESCRIPTION OF THE PREFERRED EMBODIMENTS

Figure 5:
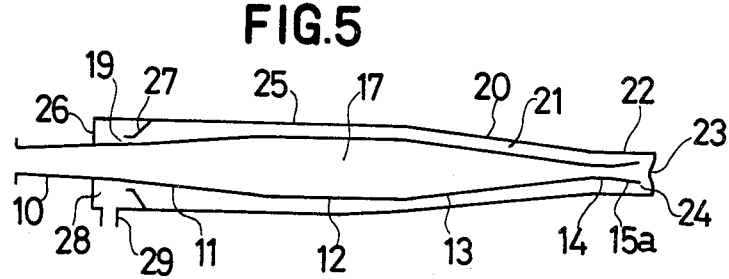

Referring initially to FIG. 3, which shows the basic embodiment of the present invention, an internal combustion engine is shown schematically and is identified by the reference numeral 100. Engine 100 has an exhaust port 1 which is connected by an inlet opening 9 to the exhaust system of the present invention for a two-cycle engine. The exhaust system has a continuously elongated exhaust pipe which defines a first expansion chamber 17 and a second expansion chamber 18. The first expansion chamber 17 includes, in the order of the flow of the exhaust gases out from engine 100, a small divergent diameter portion 100 which pneumatically communicates with exhaust port 1 of the engine 100 at the inlet opening 9 thereof, a first diffuser portion 11 having a divergent wall which defines a progressively expanding exhaust gas flow passage having a cross-section which increases as the exhaust gas moves away from exhaust port 1, a large constant portion 12 having a constant diameter, and a rear cone-shaped portion 13 having a convergent wall which defines a progressively reducing exhaust gas flow passage having a cross-section which decreases as the exhaust gas moves away from the first diffuser portion 11 to the second expansion chamber 18. The second expansion chamber 18 includes, in the order of the flow of the exhaust gases out from engine 100, a first small diameter portion 14 having a constant diameter and a second diffuser portion 15 having a divergent wall which defines a progressively expanding exhaust gas flow passage having a cross-section which increases as the exhaust gas moves away from exhaust port 1. The second diffuser 15 is opened to the atmosphere at an outlet opening 16 thereof. Each of the portions of the exhaust pipe shown in FIG. 3 has its center line coincident with the double-dash center line O—O.

The operation of the basic embodiment of the present invention will now be described. The exhaust gases from engine 100 are discharged from the exhaust port 1 through outlet 9 into the first expansion chamber 17. Because of the shape of the first divergent portion 11, a first pressure drop or relative vacuum is created in the first expansion chamber in the area substantial adjacent outlet 9. This first pressure drop or relative vacuum acts to create the Kadenacy Effect so as to more effectively draw fresh gas into the cylinders of engine 100. The rear-cone shaped portion 13 of the first expansion chamber 17 converges the exhaust gas flow, which results in a reduction of the engine noise present in this exhaust gas flow. However, the convergence of the exhaust flow by the rear-cone shaped portion 13 also results in an increased pressure level in the exhaust gas flow, which results in decreased engine performance and efficiency because the Kadenacy Effect is substantially decreased. The second expansion chamber 18 overcomes the deficiencies caused by the rear-cone shaped portion 13 by the creation of a second pressure drop or relative vacuum in the area substantially adjacent portion 14. The second pressure drop or relative vacuum acts to draw out the exhaust gases present in the rear-cone shaped portion 13 so as to increase the overall Kadenacy Effect produced by the muffler system of the present invention. The exhaust gases present in the second expansion chamber 18 are discharged to the atmosphere at opening 16.

FIG. 4A plots the actual physical dimensions of one version of the embodiment of FIG. 3. FIG. 4B plots the performance of the version of FIG. 4A, as shown by the solid trace 22, with respect to the performance of a conventional muffler system having the same dimensions, as shown by the dashed trace 20. The vertical axis of FIG. 4A represents horse power (H.P.) produced by engine 100, and the horizontal axis represents engine revolutions-per-minute. In FIG. 4B, the two muffler systems are pneumatically connected to a two-cycle engine having two cylinders with a capacity of 440 cc. It is now apparent from FIG. 4B that in the case of the exhaust system of the present invention, the engine output improves by 2-4 HP. Even when a muffler is provided after the second diffuser of the exhaust system of the present invention, the same improved efficiency is produced. The selection of the physical dimensions of the second diffuser 15 of the second expansion chamber 18 may be performed either by calculation or by experimental methods. However, experimental results have confirmed that optimum engine performance is obtained when the second diffuser 15 is designed to have the same diverging rate and length as the first diffuser 11.

However, according to the arrangement of the second diffuser 15, as shown in FIG. 3, the exhaust gas flow and associated sound waves from the expansion chamber 17 converge at the central portion on the rear cone-shaped portion 13, which causes sound waves both to be projected back towards motor 100 and to be carried out with the exhaust gases at opening 16. In addition, the second diffuser 15 functions as a sound megaphone, which results in an increase in the exhaust noise level. Further, because the exhaust gases have a relatively high temperature, the small diameter portion 14, which typically has a diameter in the range of 25 mm, must be strong enough to support the second diffuser 15. In order to improve these limitations present in the first embodiment, as shown in FIG. 3, further improved modified embodiments are provided, as shown in FIGS. 5 to 13. It should be noted in this connection that like reference numerals in FIGS. 5 to 13 designate the same portions shown in FIG. 3.

Referring now to the embodiment shown in FIG. 5, the first expansion chamber 17 includes the first diffuser portion 11 and the rear cone-shaped portion 13. The first small portion 14 pneumatically connects the first expansion chamber 17 with the second expansion chamber. The second diffuser of the second expansion chamber includes a tapered pipe 15a, a constant diameter portion 22 provided at one end with a reflector 23 having an undulated surface, and an expansion portion 20. The tapered pipe 15a is separated by the distance 24 from reflector 23, and the expansion portion 20 is separated by an annular cross-sectional spacing 21 from the outer wall surface of the rear cone-shaped portion 13. Connected to the second diffuser at the other end is a large constant diameter portion 25 having an end plate 26. An annular divider 27 is provided near the rear end plate 26 and defines a muffling chamber 28 which acts to further reduce the noise level in the exhaust gas. The end plate 26 also functions as an integral connecting member between the inner pipe, which includes the first diffuser 11, and the outer pipe, which includes the large constant diameter portion 25. An opening 19 is provided between the annular divider 27 and the first diffuser 11. Muffling chamber 28 is, in turn, pneumatically connected to a tail pipe 29.

Figure 6:
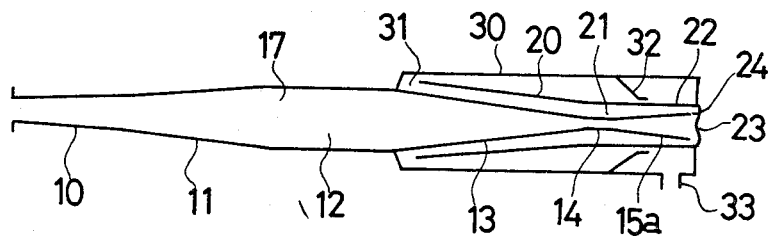

Another embodiment of the present invention is shown in FIG. 6. The first expansion chamber 17 includes the first diffuser portion 11 and the rear cone-shaped portion 13. The first portion 14 pneumatically connects the first expansion chamber 17 with the second expansion chamber. The second diffuser of the second expansion chamber includes a tapered pipe 15a, a constant diameter portion 22 provided at one end with a reflector 23 having an undulated surface, and an expansion portion 20. The tapered pipe 15a is separated by the distance 24 from reflector 23, and the expansion portion 20 is separated by an annular cross-sectional spacing 21 from the outer wall surface of the rear cone-shaped portion 13. Connected to the second diffuser at the other end of a spacing 31 is an outer cylindrical housing 30. An annular divider 32 is provided near the end plate 23 and defines a muffling chamber which acts to reduce further the noise level of the exhaust gas. The muffling chamber, in turn, is pneumatically connected to a tail pipe 33. It should be noted that the arrangement of this embodiment produces a muffling system whose actual length is much shorter than its effective length.

Figure 7:
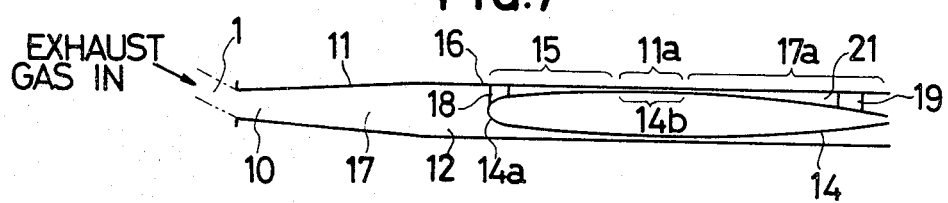

Another embodiment of the present invention is shown in FIG. 7. The first expansion chamber 17 includes the diffuser portion 11. The rear cone-shaped portion is defined by the gap between in the inner surface of an outer tubular portion 16 and the outer surface of an inner tubular member 14 in the region indicated by reference numeral 15. The inner tubular member 14 has a ballistic-curved head portion 14a, and is so designed that its cross-sectional area increases, is at its largest at a constant diameter portion 14b, and then decreases. As stated above, the section between the head portion 14a and the constant diameter portion 14b functions as the rear cone-shaped portion. On the other hand, the section 17 between the constant diameter portion 14b and an end of the inner and outer tubes 14 and 16, respectively, functions as the second diffuser of the second expansion chamber. In addition, an annular passage 11 having a small cross-section is provided between the outer surface of the inner tube 14 and the inner surface of the outer tube 16. The reference numerals 18 and 19 designates plate rib provided on the outer surface of the inner tube 14 within a plane including the center line of the inner tube 14. Plate ribs 18 and 19 are welded to the inner surface of the outer tube 16 and act to position concentrically the inner and outer tubes 14 and 16. Alternately, ribs 18 and 19 can be replaced with a protrusion integrally formed on the inner tube 14.

The embodiment shown in FIG. 7 operates in the same manner as the embodiment of FIG. 3. However, it should be noted that the additional surface area introduced by the inner tubular member of FIG. 7 results in greater noise reduction as well as improved dissipation of heat in the exhaust gases. In addition, the configuration results in an exhaust system which exhibits an improved mechanical integrity.

In the embodiment shown in FIG. 8, an inner tube 43 is provided in a concentric arrangement in the interior of an outer pipe having portions 11', 44, 14' and 45. Inner tube 43 has a conical-shaped head portion 43a and a constant diameter portion 43 which is opened to the atmosphere at its other end. The first expansion chamber includes a first diffuser defined by portion 11', and a rear cone-shaped portion defined by the inner surface of the portion 44 of the outer pipe and the outside surface of the conical-shaped head portion 43a. The second diffuser of the second expansion chamber is defined by outer surface of the constant diameter portion 43 and the inner surface of the portion 45 of the outer pipe. Because portions 43a and 43 provide a large surface area, the embodiment of FIG. 8 exhibits the same advantages inherent in the large surface area used in the embodiment of FIG. 7.

In the embodiment shown in FIG. 9, the first expansion chamber includes the expansion portion 51 of the outer pipe 50, and the rear cone-shaped portion is defined by the outer surface of the conically-shaped portion 53 of the inner member 54 and the inner surface of the outer pipe 50. The rear cone-shaped portion is pneumatically connected to the second expansion chamber. It should be noted that the inner member 54 is concentrically disposed within the interior of outer pipe 50. The second diffuser of the second expansion chamber is defined by the outer of a portion surface 58 of the inner member 54, the inner surface of portion 56 of the outer pipe 50, undulated end plate 57 at the end of outer pipe 50, and the inner surface of portion 58. Reference numeral 52 designates a convergent pipe, which separates the second diffuser from a muffler chamber defined by the convergent pipe 52 and the inner surface of the conically-shaped portion 53 of the inner member 54. Reference numeral 59 designates a shielding plate that is disposed within the muffler chamber, and which provides additional noise abatement. The muffling chamber is pneumatically connected to the atmosphere by pipe 60.

Another embodiment of the present invention is shown in FIG. 10 and includes an outer pipe designated generally by reference numeral 63 and an inner member designated generally by reference numeral 70, which is concentrically disposed within the interior of outer pipe 63. The first diffuser of the first expansion chamber is defined by the inner surface of a divergent portion 65 of the outer pipe 63. The rear cone-shaped portion of the first expansion chamber is defined by the outer surface of a conically-shaped portion 68 of inner member 70 and the inner surface of the outer pipe 63. The rear cone-shaped portion of the first expansion chamber is in pneumatic connection with the second expansion chamber. The second expansion chamber is defined by the outer surface of a portion 62 of the inner member 70, the inner surface of a divergent portion 64 of the outer pipe 63, the inner surface of portion 62, the inner surface of a conical end plate 67 disposed between the end of outer pipe 63 and the end of an inner pipe 69, and the outer surface of a divergent portion 66 of inner pipe 69. A divider 71 fastened to the inner surface of the inner member 70 separates the second diffuser from a muffler chamber defined by the inner surface of conically-shaped portion 68 and divider 71. The muffler chamber is connected to the atmosphere by inner pipe 69. It should be understood that the inner member 70 may be fastened so as to be disposed concentrically within the interior of the outer pipe 63 by the use of any suitable fastening arrangement such as plate supports and the like.

Figure 11:
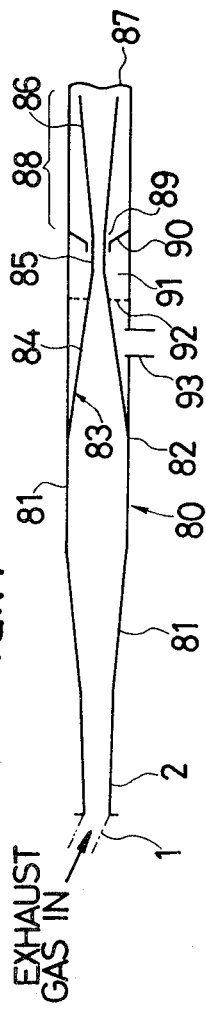

Another embodiment of the present invention is shown in FIG. 11. The first diffuser of the first expansion chamber of this embodiment is defined by a divergent portion 81 of an outer pipe designated generally by the reference numeral 80. An inner pipe designated generally by the reference numeral 83 is concentrically disposed within outer pipe 80 and is fastened thereto at a concentric ring portion designed by the reference numeral 82. The rear cone-shaped portion of the first expansion chamber is defined by the inner surface of a convergent portion 84 of the inner pipe 83. The rear cone-shaped portion of the first expansion chamber is pneumatically connected by a small diameter portion 85 of inner pipe 83 to the second diffuser of the second expansion chamber. The second diffuser is defined by the inner surface of a divergent portion 86 of the inner pipe 83, an undulated end plate 87 disposed at the end of outer pipe 80, the outer surface of divergent portion 86, and the inner surface of the outer pipe 80 along section 88 thereof. The second diffuser, in turn, is in pneumatic connection via an opening 89 formed by a divider 90 with a muffler chamber, designated generally by the reference numeral 91. Muffler chamber 91 is defined by the divider 90, and by the outer surface of inner pipe 83 and the inner surface of outer pipe 80. A porous plate 92 for absorbing sound is disposed within the muffler chamber 91 and acts to produce additional noise abatement. A pipe 93 connects the muffler chamber 91 with the atmosphere.

Figure 12:
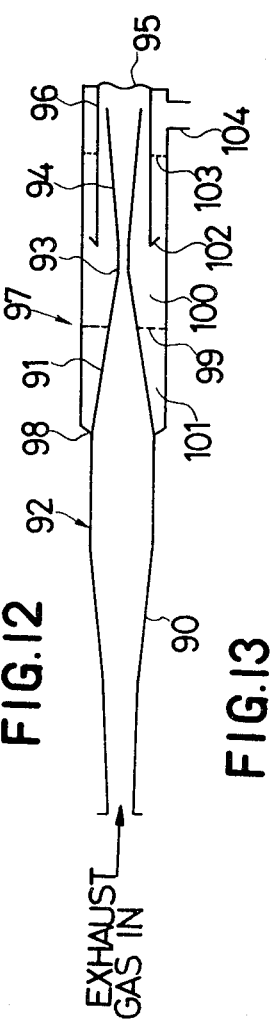

Another embodiment of the present invention is shown in FIG. 12. The first diffuser of the first expansion chamber is defined by a divergent portion 90 of a first pipe designated generally by the reference numeral 92. A second pipe, designated generally by the reference numeral 97, is concentrically disposed around the end portion of the first pipe 92 opposite to the exhaust gas inlet. The rear cone-shaped portion is defined by the inner surface of a convergent portion 91 of the first pipe 92. The rear cone-shaped portion is in pneumatic connection via a small diameter portion 93 of the first pipe 92 with the second diffuser of a second expansion chamber. The second diffuser is defined by the inner surface of a divergent portion 94 of the first pipe 92, undulated end plate 95 disposed at the end of second pipe 97 opposite a fastening portion 98, the inner surface of a constant diameter portion 96 of the second pipe 97, and the outer surface of divergent portion 94. The second diffuser is in pneumatic connection with a muffler chamber having a first volume defined by a porous divider 99 disposed between the outer surface of convergent portion 91 and the inner surface of the second pipe 97, the outer surface of convergent portion 91, and the inner surface of the second pipe 97. The muffler chamber has a second volume in pneumatic connection via porous divider 99 with the first volume. The second volume is defined by porous divider 99, the outer surface of convergent portion 91, and the inner surface of second pipe 97. The muffler chamber also has a third volume which is in pneumatic connection with the first volume. The third volume is defined by a vane 102 attached to the end of constant diameter portion 96 opposite to the undulated end plate 95, the outer surface of the constant diameter portion 96, the inner surface of the second pipe 97, and a porous divider 103 which is disposed between the outer surface of the constant diameter portion 96 and the inner surface of the second pipe 97. The third volume of the muffler is in pneumatic connection via porous divider 103 with the atmosphere or a muffler assembly or the like via a pipe 104.

Figure 13:
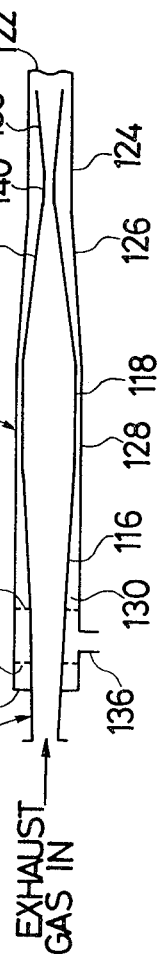

The final embodiment of the present invention, as shown in FIG. 13, has a first pipe, designated generally by the reference numeral 110, which is substantially concentrically disposed within a second pipe, designated generally by the reference numeral 112. The first pipe 110 is fastened to the second pipe 112 at the ends most adjacent the exhaust gas inlet by a flat end plate 114. The first expansion chamber of the present embodiment has a first diffuser defined by the inner surface of a divergent portion 116 of the first pipe 110. The first diffuser is in pneumatic connection via a constant diameter portion 118 of the first pipe 110 with a rear cone-shaped portion defined by the inner surface of a convergent portion 120 of the first pipe 110. The rear cone-shaped portion is in pneumatic connection via a small diameter portion 140 of the first pipe 110 with a second expansion chamber having a second diffuser. The second diffuser is defined by the inner surface of a divergent portion 138 of the first pipe 110, the inner surface of an undulated end plate 122 disposed at the end of the second pipe 112 opposite flat end plate 114, the outer surface of divergent portion 138, and the inner surface of a constant diameter portion 124 of the second pipe 112. The second diffuser is in pneumatic connection with a muffler chamber defined by the inner surface of a divergent portion 126 of the second pipe 112, the outer surface of the convergent portion 120, the outer surface of the large diameter portion 118, the inner surface of a constant diameter portion 128 of the second pipe 112, and the outer surface of the divergent portion 116. The muffler chamber, in turn, is in pneumatic connection via a porous divider 132 disposed between the outer surface of the divergent portion 116 and the inner surface of the constant diameter portion 128 with a pipe 136. A porous divider 134 is disposed between the outer surface of the divergent portion 116 and the inner surface of constant diameter portion 128 opposite to pipe 136 than porous divider 132.

It should be noted that each of the embodiments shown in FIGS. 5–13 and described above function in the fashion described with relation to the basic embodiment of FIG. 3. It should be understood that the present invention is not limited to the structures of FIGS. 5–13, but encompasses any muffler system for a two-cycle engine whose function is substantially in accordance with the function of the basic embodiment of the subject invention as described above and as shown in FIG. 3.

What is claimed is:

1. In an exhaust system for a two-cycle engine and of the type having a first expansion chamber including an exhaust gas inlet opening and a diverging pipe portion which decreases the gas pressure in the inlet opening, and including a rear cone-shaped converging portion which increases the gas pressure, the improvement comprising:
a second expansion chamber having a discharge end open to the atmosphere and an inlet end for receiving the exhaust gas from said first expansion chamber so as to decrease the gas pressure; said second expansion chamber comprising:
an outwardly tapered pipe portion;
a constant diameter portion surrounding said tapered pipe portion and closed by an undulated reflector plate spaced from the outlet of said tapered pipe portion;
an outwardly flared expansion portion connected to the open end of said constant diameter portion and extending back toward said first expansion chamber;
a hollow cylindrical housing enclosing said rear cone-shaped portion, said outwardly tapered pipe portion, said constant diameter portion, and said outwardly flared expansion portion; and
annular divider means disposed in said cylindrical housing and defining a muffling chamber, said chamber being open to the atmosphere.

* * * * *